US012452089B2

(12) United States Patent
Kim et al.

(10) Patent No.: US 12,452,089 B2
(45) Date of Patent: Oct. 21, 2025

(54) BLOCKCHAIN-BASED WEB DATA OWNERSHIP AND DATA ACCESS MANAGEMENT METHOD AND SYSTEM FOR TRACKING AI DATA COLLECTION

(71) Applicant: BLOCKCHAIN LABS INC., Seoul (KR)

(72) Inventors: Yong Tae Kim, Seoul (KR); Byung Wan Lim, Seoul (KR); Jong Hoon Park, Hanam-si (KR)

(73) Assignee: BLOCKCHAIN LABS INC., Seoul (KR)

( * ) Notice: Subject to any disclaimer, the term of this patent is extended or adjusted under 35 U.S.C. 154(b) by 232 days.

(21) Appl. No.: 18/461,204

(22) Filed: Sep. 5, 2023

(65) Prior Publication Data

US 2025/0055712 A1  Feb. 13, 2025

(30) Foreign Application Priority Data

Aug. 9, 2023 (KR) .......................... 10-2023-0103842

(51) Int. Cl.
  *H04L 29/06*  (2006.01)
  *G06Q 30/04*  (2012.01)
  *H04L 9/00*   (2022.01)
  *H04L 9/32*   (2006.01)

(52) U.S. Cl.
  CPC .............. *H04L 9/50* (2022.05); *G06Q 30/04* (2013.01); *H04L 9/3247* (2013.01)

(58) Field of Classification Search
  CPC ....... H04L 63/20; H04L 9/50; H04L 63/0263; H04L 63/0209; H04L 63/10; H04L 9/3247
  See application file for complete search history.

(56) References Cited

U.S. PATENT DOCUMENTS

| | | | |
|---|---|---|---|
| 11,436,599 B2* | 9/2022 | Wei ........................ | G06F 16/535 |
| 11,636,776 B2* | 4/2023 | Latorre .................. | G09B 19/00 |
| | | | 707/827 |
| 11,954,686 B2* | 4/2024 | Wang ................. | G06Q 20/4014 |

* cited by examiner

*Primary Examiner* — Longbit Chai
(74) *Attorney, Agent, or Firm* — Studebaker Brackett PLLC (57) ABSTRACT

There is disclosed a website management device including a memory that stores an administrator DID and an administrator private key, a communication interface that communicates with a blockchain network, and at least one processor, and the at least one processor submits a first transaction for creating a URI authentication document to the blockchain network, the first transaction including an administrator digital signature created based on the administrator private key, the first URI, and an access rule for data included in the first URI, and retrieves a remittance transaction having a blockchain account on the blockchain network corresponding to the administrator DID as a recipient, the remittance transaction including a fee statement prepared based on the access rule included in the first URI authentication document. In addition to the above, various embodiments identified through the specification are possible.

11 Claims, 7 Drawing Sheets

BLOCKCHAIN-BASED WEB DATA OWNERSHIP AND DATA ACCESS MANAGEMENT METHOD AND SYSTEM FOR TRACKING AI DATA COLLECTION

CROSS-REFERENCE TO RELATED APPLICATION

This application claims priority to Korean Patent Application No. 10-2023-0103842 filed on Aug. 9, 2023, and all the benefits accruing therefrom under 35 U.S.C. § 119, the contents of which are incorporated by reference in their entirety.

BACKGROUND

Embodiments disclosed herein relate to blockchain technology for advertising information on data on the web and tracking data collection behavior of AI data collection agents.

Development companies of artificial intelligence, search engines, or the like, of large language models (LLM) require large-scale data for development. Accordingly, the development companies use data published on the Internet, such as news articles, blogs, contents uploaded to online communities and SNS, various images published on the web, video books, papers, programming source codes, or the like, for model training or engine performance improvement, and controversy over the unauthorized use of such data is spreading. This is because all data published on the Internet has an owner or author and thus, a rightful person's ownership or copyright of the data is being infringed.

In general, development companies create agents (bots) to crawl data on the web, and these agents collect data published on the Internet.

SUMMARY

Controversy over the unauthorized use of data is spreading, but guidelines or regulatory laws have not been established regarding which data can be used among data published on the Internet, how to pay usage fees for data, and so on. Furthermore, there is no standard protocol or technical method defined to check ownership information on collected data and pay a fair price for data usage.

The present disclosure provides a method and device capable of allowing agents using web data to check ownership information for the data by advertising ownership information about the data and guidelines for data usage on a blockchain network, and furthermore, paying an owner of the web data a usage fee for the data through a payment function on the blockchain network. The present disclosure also provides a method and device capable of tracking data usage details of data agents by enabling the data agents to record the data usage details on a smart contract on the blockchain network.

According to one aspect of the present disclosure, a method performed by a website management device, a blockchain network, and an AI data agent, the method including submitting, by the website management device, a first transaction for creating a URI authentication document to the blockchain network, wherein the first transaction includes an administrator digital signature of the website management device, a first URI, and an access rule for data included in the first URI, verifying, by the blockchain network, the administrator digital signature and adding the access rule in a first URI authentication document in response to the submitting of the first transaction, retrieving, by the AI data agent, the first URI authentication document based on the first URI and acquiring the data included in the first URI, and submitting, by the AI data agent, a remittance transaction for a usage fee calculated based on the access rule, wherein the remittance transaction takes a first blockchain account associated with the website management device as a recipient.

According to another aspect of the present disclosure, a website management device associated with a first URI includes a memory configured to store an administrator DID and an administrator private key, a communication interface configured to communicate with a blockchain network, and at least one processor, in which the at least one processor is configured to submit a first transaction for creating a URI authentication document to the blockchain network, the first transaction including an administrator digital signature generated based on the administrator private key, the first URI, and an access rule for data included in the first URI, and retrieve a remittance transaction having a blockchain account on the blockchain network corresponding to the administrator DID as a recipient, the remittance transaction including a fee statement prepared based on the access rule included in the first URI authentication document.

The at least one processor may be configured to create the administrator DID and the administrator private key, submit a second transaction for registration of the first URI to the blockchain network, wherein the second transaction includes the administrator DID, the administrator digital signature, and the first URI, generate a domain ownership verification file based on a random value generated by the blockchain network in response to the submitting of the second transaction by the blockchain network when the random value is obtained, and upload the domain ownership verification file to a specific address, and retrieve at least one piece of information included in the first URI authentication document based on the first URI when verification of the domain ownership verification file is completed and a root node corresponding to the first URI and the first URI authentication document corresponding to the root node are created on the blockchain network.

BRIEF DESCRIPTION OF THE DRAWINGS

Exemplary embodiments can be understood in more detail from the following description taken in conjunction with the accompanying drawings, in which.

With respect to the description of the drawings, the same or similar reference signs may be used for the same or similar elements.

DETAILED DESCRIPTION OF EMBODIMENTS

Hereinafter, various embodiments of the present disclosure will be described with reference to the accompanying drawings. However, this is not intended to limit the present disclosure to the specific embodiments, and it is to be construed to include various modifications, equivalents, and/or alternatives of embodiments of the present disclosure.

Figure 1:
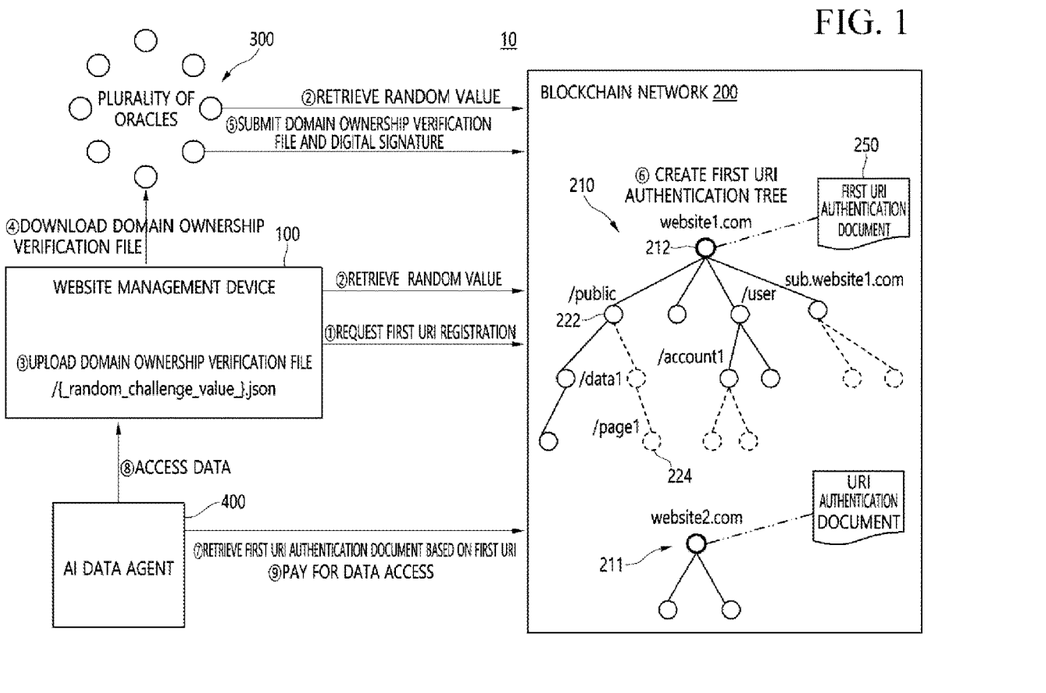
FIG. 1 is a diagram for describing a configuration and operations of a blockchain-based web data ownership and data access management system for AI data collection and tracking according to one embodiment.

FIG. 1 is a diagram for describing a configuration and operations of a blockchain-based web data ownership and data access management system (hereinafter a system 10) for AI data collection and tracking according to one embodiment. The system 10 according to one embodiment may include a blockchain network 200. The system 10 may provide a uniform resource identifier (URI) authentication protocol that allows public registration of ownership of web data and tangible and intangible assets with copyrights represented by a URI by using the blockchain network 200 and a decentralized identifier (DID) capable of being retrieved through the blockchain network 200.

On the system 10, website owners and web service (e.g., social network service (SNS), online community, and the like) users may create DIDs on the blockchain network 200 and register ownership/copyright information and data access and transaction rules for data owned by the owners and users and published on the web in the blockchain network 200. In this way, anyone is able to transparently check information regarding data published through the blockchain network 200.

Hereinafter, an embodiment in which a website owner/administrator publishes ownership and data access information regarding their website through the blockchain network 200 will be described first with reference to FIGS. 1 to 4. An embodiment in which a user of a website publishes ownership and data access information regarding their data (e.g., a user page on the website) through the blockchain network 200 will be described later with reference to FIGS. 5 and 6.

Referring to FIG. 1, the system 10 according to one embodiment may include a website management device 100, a plurality of oracles 300, and an AI data agent 400.

In one embodiment, it is assumed that the website management device 100 is an electronic device of an administrator (e.g., an operating company of SNS service, online community service, or the like) that manages or owns a specific URI (hereinafter, a first URI). The first URI is a unique address representing a resource on the Internet, and may include various resources on the Internet, such as a website domain, a website user, a web page, and the like, expressed in the form of a URI.

In one embodiment, the first URI may be a website domain (URL) (e.g., https://website1.com). The website management device 100 may publish information associated with the first URI through the blockchain network 200. Hereinafter, the first URI is described as a domain (URL) of website1.com by way of example.

The blockchain network 200 may include at least one blockchain network among known public blockchain networks. Subjects 100, 300, and 400 on the system 10 are identified based on DIDs capable of being retrieved through the blockchain network 200.

In one embodiment, the blockchain network 200 may include a DID document (not shown). The DID document may be understood as a storage space for DIDs of the subjects 100, 300, and 400 on the system 10 and information associated with the DIDs. The subjects 100, 300, and 400 on the system 10 and the blockchain network 200 may retrieve information (e.g., public key) associated with the DID based on the DIDs of other subjects through the DID document. As identifiers of the subjects 100, 300, and 400 on the system 10 to be described below, the DIDs are described according to the standard specifications of the World Wide Web Consortium (W3C), a web standardization organization.

In various embodiments, the subjects 100, 300, and 400 on the system 10 create a pair of private and public keys based on the ECDSA encryption algorithm using the secp256k1 curve, the EdDSA algorithm using the Ed25519 curve, or the RSA encryption algorithm. The subjects 100, 300, and 400 on the system 10 may generate digital signatures based on their private keys. In one embodiment, the public keys may be used as DIDs, or the subjects 100, 300, and 400 on the system 10 may create the DIDs separately from the public keys.

In one embodiment, the blockchain network 200 may store information on a URI based on a tree structure (hereinafter referred to as a URI authentication tree). The URI authentication tree and its related transactions, which will be described below, may be implemented as smart contracts on the blockchain network 200.

Referring to FIG. 1, a first URI authentication tree 210 corresponding to the first URI of the website management device 100 is shown as an example. Hereinafter, the tree structure will be described with reference to the first URI authentication tree 210. For example, the first URI, the highest level, may correspond to a root node 212, and URIs, lower levels than the first URI, may correspond to child nodes of the root node 212. For example, since the first URI of the root node 212 is https://website1.com, sub-paths of the first URI, such as https://website1.com/public, https://website1.com/user, and https://website1.com/user/account1, may be added to the first URI authentication tree 210 as child nodes of the root node 212.

In one embodiment, all nodes included in the URI authentication tree may have respective corresponding URI authentication documents. A URI authentication document may store information associated with a specific URI. Information associated with the specific URI may include, for example, a specific URI, an owner DID, owner identity information, copyright information, data access rules, and data set sales information. The root node 212 corresponding to the first URI may have a first URI authentication document 250 storing information associated with the first URI. In addition, nodes other than the root node 121 may have respective corresponding URI authentication documents for sub-paths of the first URI.

The owner DID may be understood as the DID of an owner of a specific URI corresponding to the tree node. The owner identity information is identity information about the owner of the URI corresponding to the tree node, and in various embodiments, the identity information may be a certificate issued in the form of Verifiable Credentials (VC) according to the W3C standard. For example, the DID (hereinafter referred to as administrator DID) of the website management device 100 may be recorded as the owner DID in the first URI authentication document 250.

The copyright information may include information regarding copyright, such as the name of an author of data included in the specific URI corresponding to the tree node, the date of creation, the date of publication, and the type of work.

The data access rules may be understood as access rules for the data included in the specific URI corresponding to the tree node and sub-paths of the URI. In one embodiment, the data access rules may include at least one path associated with the first URI (the first URI and sub-paths of the first URI), a list of user agents to be granted access to data included in the at least one path, and price information for the data included in the at least one path. The user agent may be understood as the AI data agent 400.

Table 1 below is an example of the data access rules according to one embodiment. The data access rules may include allowed data types and their prices, and disallowed data types. It includes paths, user agents, and price information for data included in the paths. That is, data types allowed or disallowed for a specific user agent for a specific path may be determined, and a different price policy may be determined for each type. Authorization for registering the data access rules is held by the owner of the specific URI (the owner of the tree node corresponding to the specific node). For example, the website management device 100 has the authority to register data access rules included in the first URI authentication document 250. Accordingly, the operator of the website may directly set and publish access rules for the data included in the website.

TABLE 1

| Path | User agent | Allow | | Disallow |
| --- | --- | --- | --- | --- |
| | | Type | Price | Type |
| /public/ | *(all) | Image | $10/MB | Video |
| | | Text | $20/MB | |
| | | Code | $30/MB | |
| | Company A, company B | *(all) | $40/MB | Video, image |
| /private/ | *(all) | — | — | *(all) |

Paths of the data access rules may include the URI corresponding to the tree node and its sub-paths. The user agent may include information corresponding to the operator of the data agent, such as a specific AI company, a search engine company, or the like. Alternatively, when the user agent is specified as *(all) (when no special rule is specified), a policy may be referred to as a policy for any user agent other than the specified user agent.

The data types of the data access rules may include, for example, images, text, codes, and video. Different pricing policies may be set for each data type. Alternatively, allow/disallow may be determined for each data type.

In the example of Table 1, for all website contents included in the path of website1.com/public and its sub-paths, the owner of the first URI, that is, website1.com, allows data access based on the price of $10 per 1 megabyte (MB) for the image data type, $20 per 1 MB for the text data type, and $30 per 1 MB for the code data type, and disallows data access for the video type, for all arbitrary user agents. Further, for the same path, separate access rules are specified for company A and company B. Data access for the video data type and the image data type is disallowed, and data access prices of $40 per 1 MB are specified for other data types. In addition, access to data in the website1.com/private path, which is another sub-path, and its sub-paths is disallowed.

The data set sales information may include a data set and its price information based on the data included in the corresponding URI. The data set can be understood as pre-refined and packaged data in a form suitable for AI learning. Various data sets may be configured based on the data included in the URI, and different price information may be published for each data set. For example, the website management device 100 may organize a data set combining data included on a first URI and sub-paths of the first URI, set a price for the data set, and publish the price on the first URI authentication document 250.

In various embodiments, the system 10 may provide a data market to purchase the data set. For example, the system 10 may provide a data trade smart contract including a remittance function and a data transmission function through the blockchain network 200.

The tree structure according to one embodiment may be set so that only the parent node is able to add child nodes. That is, the owner of the parent node (e.g., an electronic device with the owner DID) has the authority to create child nodes. When a node registration request is received, the blockchain network 200 may verify whether the subject that has generated the request is the one with the authority to add the node.

When the website management device 100 first creates the first URI authentication tree 210, that is, when the root node 212 is created, it is necessary to verify whether the website management device 100 requesting the creating of the root node 212 is an owner of the first URI of the website. This verification may be performed through a plurality of oracles 300 and the blockchain network 200. A detailed description thereof will be described below with reference to FIG. 3.

After creating the root node 212, the website management device 100 may have the authority to add child nodes corresponding to sub-addresses of the first URI.

In various embodiments, among the sub-addresses of the first URI, sub-addresses owned by a subject different from a website administrator such as a website user. For example, in a relationship between a website providing SNS service and a user, or a relationship between a website providing blog service and a user, the user's page data is created by the user, and thus ownership of the data may belong to the user. In this case, the user may request node registration for the sub-address and publish information regarding the sub-address through the URI authentication document. A detailed description thereof will be described later with reference to FIGS. 5 and 6.

The AI data agent 400 may be understood as a web data crawling agent operated by an AI development company or a search engine operating company. The AI data agent 400 collects large-scale data by repeating a behavior of accessing data published on the web and obtaining the data. In one embodiment, the AI data agent 400 accesses the first URI and obtains data stored at corresponding addresses. In this case, the AI data agent 400 may retrieve the first URI authentication document 250 corresponding to the first URI. And the AI data agent 400 may pay a data usage fee to a blockchain account of the website management device 100, which is the owner of the first URI, based on the data access rules included in the first URI authentication document 250 (see Table 1).

In various embodiments, the AI data agent 400 may access sub-addresses of the first URI and obtain data stored at corresponding addresses. For example, when a tree node and a URI authentication document corresponding to the sub-addresses are created, the AI data agent 400 refers to the URI authentication document. However, when the tree node and the URI authentication document corresponding to the sub-addresses are not created, the AI data agent 400 may refer to the URI authentication document of the closest ancestor node of the sub-addresses.

Referring to FIG. 1, nodes marked with dotted lines indicate a case in which domains on the web exist, but a tree node (e.g., the node 224) is not created. For example, in order for the AI data agent 400 to refer to the URI authentication document of https://website1.com/public/data1/page1 corresponding to the node 224, the node 224 has not been created, and thus, the AI data agent 400 refers to the URI authentication document of the node 222 corresponding to https://website1.com/public, which is the closest ancestor node.

In various embodiments, a plurality of URI authentication trees 210 and 211 corresponding to a plurality of websites may be registered in the blockchain network 200. A URI authentication tree may correspond to one domain (a root path). Anyone may check the guidelines for data included in the website by referring to the URI authentication document published through the blockchain network 200.

Figure 2:
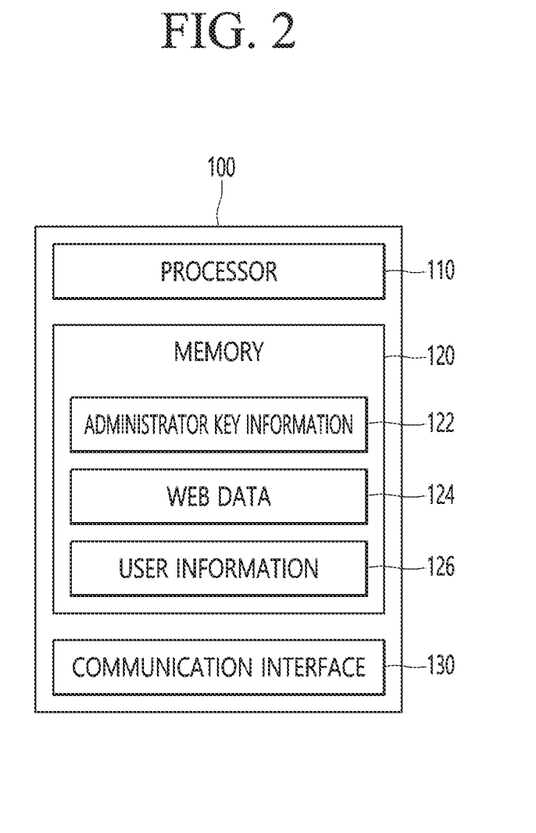
FIG. 2 is a block diagram of a website management device according to one embodiment.

FIG. 2 is a block diagram of the website management device 100 according to one embodiment. The website management device 100 according to one embodiment may include a processor 110, a memory 120, and a communication interface 130. The processor 110 may include one or more processors for controlling the overall operation of the website management device 100. The processor 110 may be operatively connected to the memory 120 and configured to execute instructions stored in the memory 120.

The memory 120 may include administrator key information 122, web data 124, and user information 126.

The administrator key information 122 may include an administrator DID and an administrator private key. In various embodiments, the website management device 100 may create a pair of an administrator private key and an administrator public key based on the ECDSA encryption algorithm using the secp256k1 curve, the EdDSA algorithm using the Ed25519 curve, or the RSA encryption algorithm. The website management device 100 may generate a digital signature (hereinafter, an administrator digital signature) based on the administrator private key. In one embodiment, the administrator public key may be used as the administrator DID, or the website management device 100 may create the administrator DID separately from the administrator public key.

The communication interface 130 may be configured to communicate with other subjects 200, 300, and 400 on the system 10.

Figure 3:
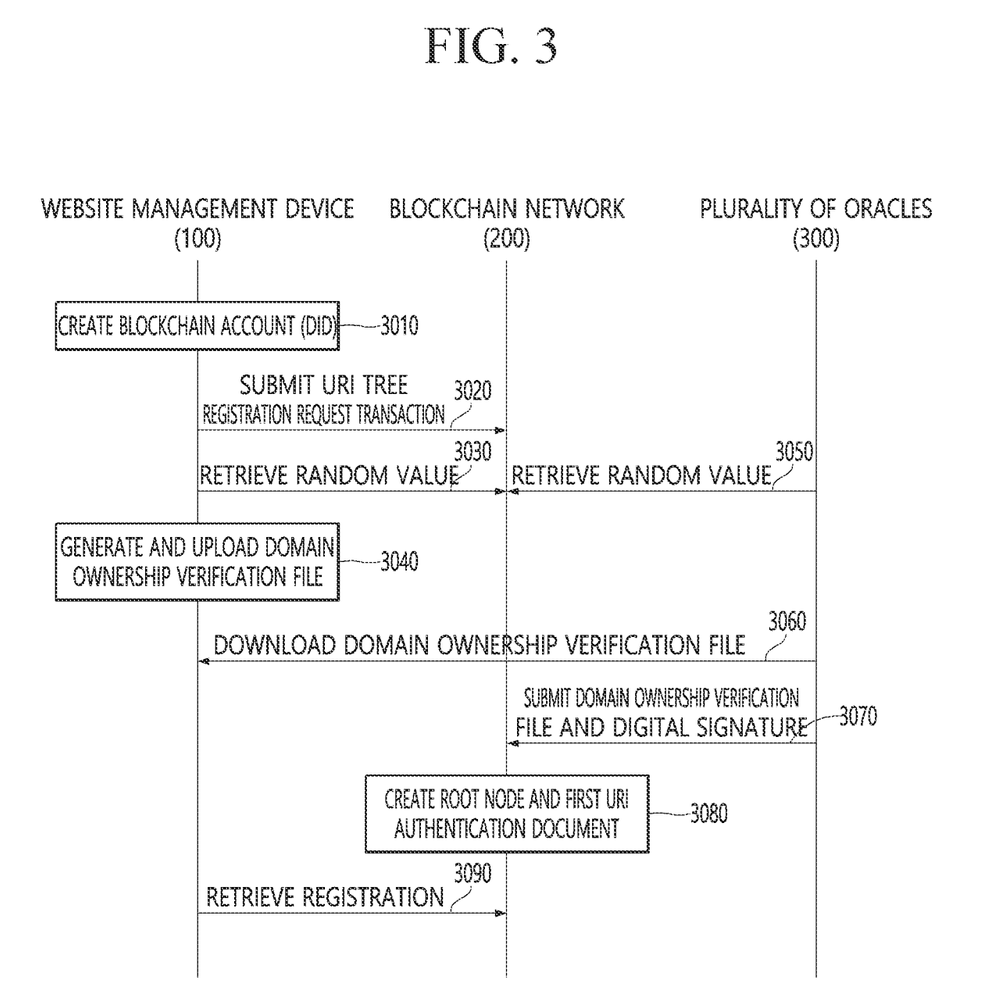
FIG. 3 is a sequence diagram of a method of registering a URI of the website management device on a blockchain network according to one embodiment.

FIG. 3 is a sequence diagram of a method of registering a URI of the website management device on a blockchain network according to one embodiment. Hereinafter, referring to FIGS. 1 and 3, a process will be described in which the website management device 100 registers the first URI on the blockchain network 200 and the first URI authentication tree 210 and the first URI authentication document 250 are created.

The website management device 100 may create an administrator blockchain account (administrator DID) on the blockchain network 200 (3010).

The website management device 100 may submit a URI tree registration request transaction to the blockchain network 200 (3020). The URI tree registration request transaction may be understood as an operation defined on the smart contract to create the first URI authentication tree 210 and the first URI authentication document 250 corresponding to the first URI owned by the website management device 100. The URI tree registration request transaction may include an owner DID of the URI and a URI to be registered on the blockchain network 200. In operation 3020, the URI tree registration request transaction may include an administrator DID and a first URI.

When the URI tree registration request transaction is completed, the blockchain network 200 may generate and publish a random value through the smart contract. The website management device 100 and the plurality of oracles 300 may retrieve the random value (3030, 3050).

When the website management device 100 obtains the random value from the blockchain network 200 (3030), the website management device 100 may generate a domain ownership verification file based on the random value and upload the domain ownership verification file to a specific address (3040).

In one embodiment, the domain ownership verification file may include the first URI, the random value, and a timestamp. The website management device 100 may electronically sign on the data of the first URI, the random value, and the timestamp based on the administrator private key. Specifically, the website management device 100 may generate a domain verification information file (e.g., a JavaScript Object Notation (JSON) format) electronically signed with the administrator private key for a domain name to be registered (the first URI) and an owner DID (the administrator DID) of the domain name, and the random value retrieved on the blockchain network 200. For example, the website management device 100 may set the file name of the domain verification information file to a random value and upload the domain verification information file to a root directory of the website domain. Therefore, anyone may download the domain verification information file of a specific domain by retrieving the random value of the blockchain network 200 (because the domain verification information file is stored with the file name of the random value in the root directory).

In operation 3040, the website management device 100 may set the random value as a file name, for example and upload the domain ownership verification file in the root directory of the first URI (https://website1.com/_random_challenge_value_.json). The domain verification information file may have the random value generated in the blockchain network 200 as the file name and include the digital signature of the owner DID, and may be uploaded to the root directory of the domain. Since the setting of the file name and the uploading of the digital signature to the root directory in this way may be done only by the subject that actually owns the domain and owns the private key of the owner DID, when the domain verification information is delivered to the smart contract of the blockchain network 200, the domain ownership may be transparently and safely verified. When this verification is completed, the corresponding domain and owner DID may be registered in a URI authentication node.

TABLE 2

Example of domain ownership verification file https://website1.com/_random_challenge_value_.json
{
　"domain" : "website1.com",
　"adminDID" : "did:infra:0x:i3jr3...qW3dt",
　"challenge" : "_random_challenge_value_",
　　"timestamp": "2023-07-28T10:17:21Z",
　"proof": {

TABLE 2-continued

Example of domain ownership verification file

```
        "type": "Ed25510Signature2020",
        "created": "2023-07-28T17:20:31Z",
        "verificationMethod":"did:infra:ua:i3jr3...qW3dt#key-1",
        "proofPurpose": "assertionMethod",
        "proofValue": "gweEDz58DAdFfa9.....CrfFPP2oumHKtz"
    }
}
```

Table 2 above is an example of the domain ownership verification file created in JSON format. In one embodiment, the domain ownership verification file may include the first URI (e.g., https://website1.com), the administrator DID (e.g., did: infra: 0x: 13jr3 . . . qW3dt), the random value (e.g., _random_challenge_value_), the timestamp (e.g., 2023-07-28T10:17:21Z) and the administrator digital signature (e.g., the part in parentheses after "proof":). The administrator digital signature is described according to the W3C's Proofs specification of verifiable credentials (reference: https://www.w3.org/TR/vc-data-model/#proofs-signatures). The administrator digital signature may be understood as signed on the first URI, the administrator DID, the random value, and the timestamp.

The plurality of oracles 300 may be those that have the authority to input external data to be recorded in the blockchain network 200 into the blockchain network 200, and oracle DIDs of the plurality of oracles 300 may be registered in the blockchain network 200 in advance (DID document). In one embodiment, the plurality of oracles 300 may transmit data to the smart contract to bring data outside the blockchain network 200 into the blockchain network 200 or export data to the outside of the blockchain network 200.

The plurality of oracles 300 may download the domain ownership verification file uploaded by the website management device 100 (3060). The plurality of oracles 300 may retrieving the random value from the blockchain network 200 (3050), and may download the domain ownership verification file from a specific address generated based on the retrieved random value (3060). For example, the plurality of oracles 300 may download the domain ownership verification file having the file name of random value stored in the first URI (root directory).

The plurality of oracles 300 may add digital signatures based on their respective DIDs (oracle DIDs) to the downloaded domain ownership verification file and submit them to the smart contract (3070).

In one embodiment, when a new URI tree registration request transaction occurs in the smart contract on the blockchain network 200, the plurality of oracles 300 may periodically check whether a 'random_challenge_value_.json' file is registered in the web server root directory of the requested domain. When the domain ownership verification file is confirmed, the plurality of oracles 300 may download the domain ownership verification file, generate digital signatures with their own oracle DIDs for the file, and transmit the digital signatures and the domain ownership verification file to the smart contract of the blockchain network 200.

When the same domain ownership verification files are submitted from a plurality of oracles 300 of a predetermined number or more among the DIDs registered as web data oracles (e.g., 10 (⅔) or more out of 15 oracles), the smart contract of the blockchain network 200 may create the root node 212 and the first URI authentication document 250 corresponding to the first URI (3083). The first URI authentication document 250 may include the administrator DID as the owner DID of the first URI. One node corresponds to one URI authentication document. The root node 212 corresponds to the first URI authentication document 250.

In operation 3080, the smart contract of the blockchain network 200 may check 1) whether or not the same domain verification information file has been submitted from a plurality of oracles 300 of a predetermined number for the domain (the first URI) requested for registration, 2) whether the random value of the submitted domain ownership verification file is the same as the random value generated in response to the submitting of the URI tree registration request transaction in operation 3020, and 3) whether the administrator digital signature in the domain ownership verification file is created based on the domain owner DID (the administrator DID). When 1) to 3) are checked, the owner DID of the first URI authentication document 250 of the root node 212 may be set as the administrator DID of the website management device 100.

When the root node 212 and the first URI authentication document 250 are created, the website management device 100 may retrieve at least one piece of information included in the first URI authentication document 250 based on the first URI (3090). For example, the website management device 100 may retrieve the owner DID included in the first URI authentication document 250 and compare the owner DID with the administrator DID stored in the memory 120. When the two match, it may be confirmed that the administrator DID has been registered as the owner of its first URI.

When the first URI authentication document 250 is registered on the blockchain network 200, anyone may request retrieving of the first URI authentication document 250 using the first URI as an input value.

Through the process of FIGS. 1 and 3, without a centralized authentication system, the website management device 100 and the plurality of oracles 300 may objectively verify ownership of the domain through the smart contract on the blockchain network 200. When the domain ownership registration process is completed, the owner of the website may perform a task of creating the URI authentication document, such as registering copyright information for the owner's website data and website data access rules, on the blockchain network 200, by being authorized to create the URI authentication document through the digital signature of the registered owner DID.

Figure 4:
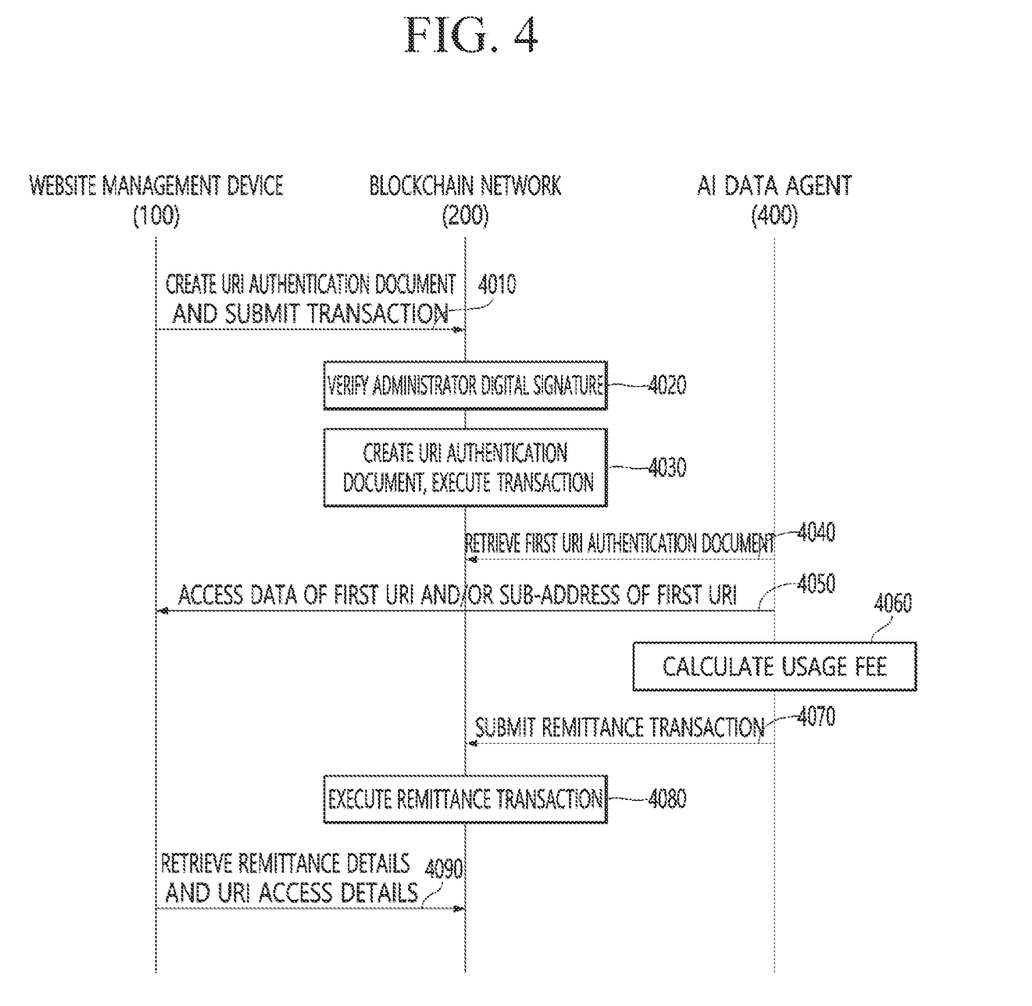
FIG. 4 is a sequence diagram of a method in which the website management device creates a URI authentication document and receives a data usage fee based thereon on a system according to one embodiment.

FIG. 4 is a sequence diagram of a method in which the website management device 100 creates a URI authentication document and receives a data usage fee based thereon on the system 10 according to one embodiment. Hereinafter, with reference to FIGS. 1 and 4, a process in which the website management device 100 creates the first URI authentication document 250 and receives a data usage fee from the AI data agent 400 based thereon will be described.

The website management device 100 may submit a URI authentication document creation transaction to the blockchain network 200 (4010). The URI authentication document creation transaction may include the administrator digital signature of the website management device 100, the first URI, and data access rules. The administrator digital signature is information necessary to prove that the URI authentication document creation transaction is a request by the owner DID included in the first URI authentication document, that is, a request by a subject having ownership of the first URI. The data access rules may be understood as access rules for data included in the first URI.

The smart contract of the blockchain network 200 may verify the administrator digital signature included in the URI authentication document creation transaction (4020). The blockchain network 200 may verify the administrator digital signature based on the owner DID included in the first URI authentication document 250. Through the verification of the administrator digital signature, it may be confirmed whether the website management device 100 requesting the creation of the URI authentication document is the owner of the first URI.

When the verification of the administrator digital signature is completed, the blockchain network 200 may add the data access rules in the first URI authentication document 250 (4030).

In various embodiments, the website management device 100 may add a plurality of items (identity information, copyright information, data set sales information) in the first URI authentication document 250 through the URI authentication document creation transaction. The contents written in the first URI authentication document 250 are published through the blockchain network 200.

The AI data agent 400 may retrieve the first URI authentication document 250 based on the first URI (4040). The AI data agent 400 may access data included in the first URI and/or a sub-address of the first URI (4050).

The AI data agent 400 may calculate a data usage fee corresponding to the first URI and/or the sub-address of the first URI (4060) and submit a remittance transaction to the blockchain network 200 based on the calculated data usage fee (4070). The remittance transaction may include a digital signature of the company (hereinafter, a company digital signature) operating the AI data agent 400 as a remitter, the data usage fee, URI access details (the first URI and the sub-path of the first URI), and an administrator blockchain account as a recipient.

In one example, the remittance transaction may include a fee statement prepared by the AI data agent 400. The fee statement may include one or more paths accessed by the AI data agent 400 (the user agent) and a data usage fee. The data usage fee may be calculated based on price information (price information included in the data access rules) for the one or more accessed paths. Referring to the data access rules of Table 1 described above, the data usage fee may be calculated based on data types included in one or more accessed paths, download capacity information for each data type, and price information.

The AI data agent 400 may pay a data usage fee published by the website management device 100 in return for accessing the data included in the first URI and/or the sub-address of the first URI. The remittance transaction may be executed on the blockchain network 200 (4080), and the website management device 100 may retrieve the URI access details and remittance details through the blockchain network 200 (4090).

In various embodiments, for a large-capacity URI access detail data, only its data hash value may be stored on the blockchain network 200, and the entire URI access detail data may be stored in a distributed data storage (e.g., an Inter Planetary File System (IPFS)).

In various embodiments, the website management device 100 may register sub-addresses of the first URI on the blockchain network 200, separately from the first URI. For example, the website management device 100 may register, in the blockchain network 200, a sub-address of the first URI having a different owner, different copyright information and/or different data access rules from the first URI, In the method described through FIG. 3, separately from the first URI.

In various embodiments, information on a URI that is not registered through the tree on the blockchain network 200 may be replaced with information on a registered parent node. For example, when the AI data agent 400 requests a document retrieval of a certain URI to access data (e.g., operation 4040), but the URI is not registered, a registered parent node of the URI may be retrieved, and the URI authentication document of the parent node may be retrieved.

Figure 5:
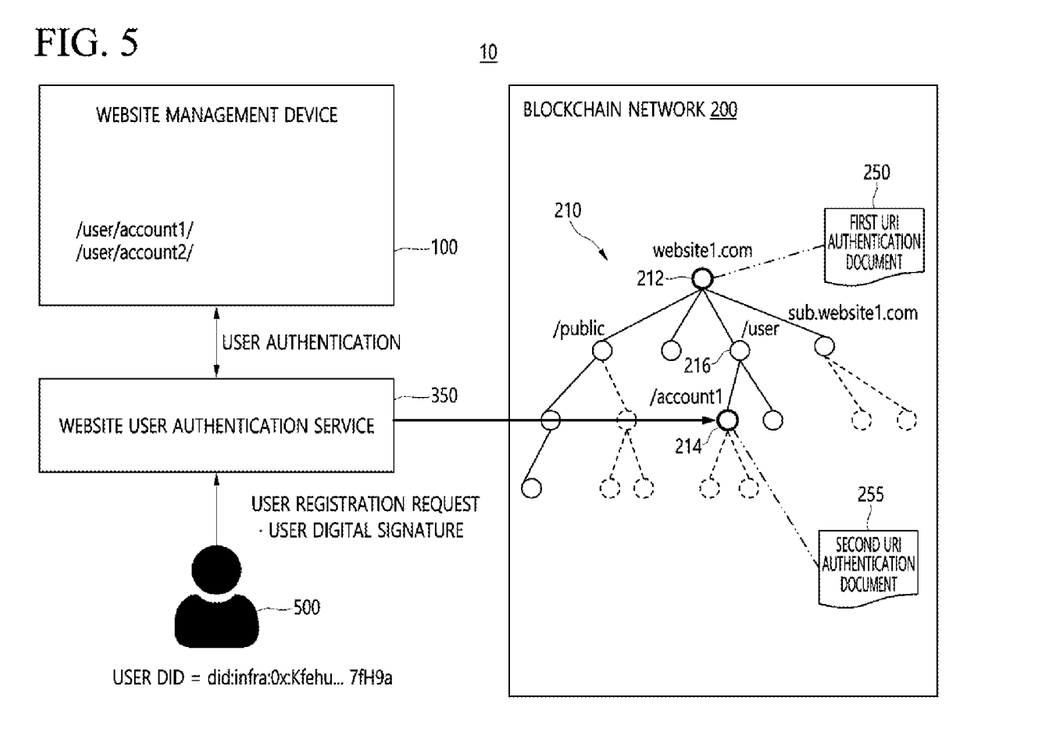
FIG. 5 is a diagram for describing a method of registering a website user's URI on the blockchain network according to one embodiment.
Figure 6:
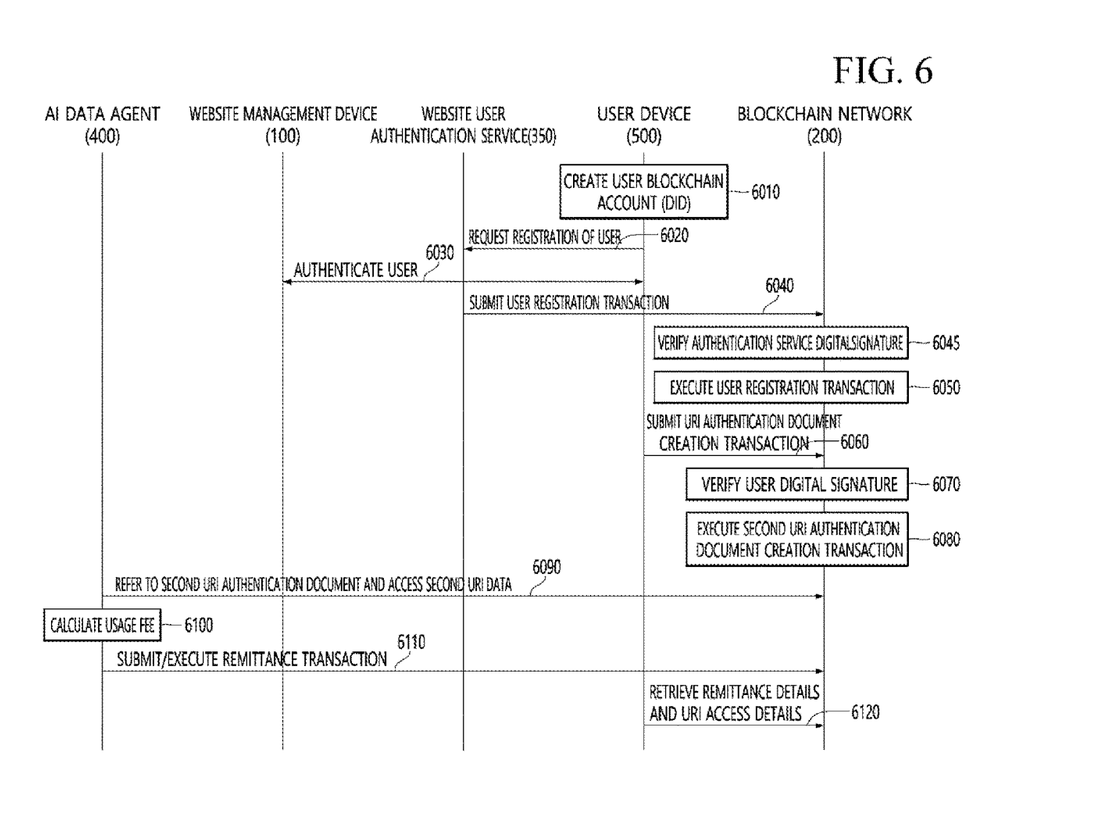
FIG. 6 is a sequence diagram of a method of creating a URI authentication document of a user and charging a data usage fee based thereon according to one embodiment.

FIG. 5 is a diagram for describing a method of registering a website user's URI on the blockchain network 200 according to one embodiment. FIG. 6 is a sequence diagram of a method of creating a URI authentication document of a user and charging a data usage fee based thereon according to one embodiment.

In one embodiment, a website user may separately generate a URI authentication document for his or her user page and separately register authentication information for data included in his or her user page in the blockchain network 200. In this case, the AI data agent 400 accessing the data included in the user page may pay the user a data usage fee for the data based on data access rules set by the user. Hereinafter, a description will be given with reference to FIGS. 5 and 6.

The user device 500 may be understood as a device associated with a user registered in the first URI. The user device 500 may create a user blockchain account and a user DID on the blockchain network 200 (6010).

The user device 500 may transmit a user registration request to the authentication service 350 (6020). The user registration request may include the user DID, the first URI (e.g., https://website1.com), and the user page (hereinafter, a second URI) on a sub-path of the first URI (e.g., https://website1.com/user/account1), and a user digital signature of the user device 500. The user digital signature may be understood as being generated based on the user private key in the user device 500. Like the subjects 100, 300, and 400, the user device 500 may create a pair of private and public keys (the user private key and the user public key) based on the ECDSA encryption algorithm using the secp256k1 curve, the EdDSA algorithm using the Ed25519 curve, or the RSA encryption algorithm. The user device 500 may generate the user digital signature based on the user private key. In one embodiment, the user public key may be used as the user DID, or the user device 500 may create the user DID separately from the user public key.

The website user authentication service (hereinafter referred to as an authentication service) 350 may be understood as a subject for authenticating a user as having subscribed to a specific website.

The authentication service 350 may perform user authentication in cooperation with the website management device 100 and the user device 500 (6030). In one embodiment, the authentication service 350 may authenticate a website user using the OAuth protocol.

Most global web services provide user authentication based on the OAuth standard protocol. Through this OAuth standard protocol (reference: https://en.wikipedia.org/wiki/OAuth), a third-party application service (OAuth Client) may easily authenticate a user of a web service that provides OAuth (requiring a user to allow) and access web data resources. Using this OAuth standard protocol, the authentication service 350 may authenticate the user of the user device 500 as a user subscribed to a specific web service.

When it is proved that the user device 500 is the owner of the second URI, the authentication service 350 may submit a user registration transaction to the blockchain network 200

(6040). The user registration transaction may include the user DID, the second URI, and the digital signature of the authentication service 350 (hereinafter referred to as an authentication service digital signature).

In one embodiment, the authority to create a node may be delegated to the authentication service 350 from the website management device 100. Since the tree structure of the blockchain network 200 may be set so that only a parent node is able to create a child node, the website management device 100 may assign, to the authentication service 350, any one tree node on a path between the root node and a node to be newly created.

In the embodiment of FIG. 6, since registration of the second URI (e.g., https://website1.com/user/account1) is required, the website management device 100 may assign to the authentication service 350, a node 216 (e.g., corresponding to https://website1.com/user), which is any one node on the path between the root node 212 and a tree node 214. The authentication service DID of the authentication service 350 may be recorded in the owner DID of a URI authentication document of the node 216, and the authentication service 350 may add a child node of the node 216.

The blockchain network 200 may verify the authentication service digital signature in response to submitting of the user registration transaction (6045). The authority to add a child node of the tree node 216 of the authentication service 350 is proved when verification of the authentication service digital signature is completed. By executing the user registration transaction (6050), the blockchain network 200 may create the tree node 214 corresponding to the second URI and create a second URI authentication document 255 corresponding to the node 214 (6050). The user DID may be included as the owner DID of the second URI authentication document 255.

The user device 500 may retrieve the created second URI authentication document 255 based on the second URI.

When node creation is complete, the user device 500 may submit a URI authentication document creation transaction to the blockchain network 200 (6060). The URI authentication document creation transaction may include the user digital signature of the user device 500, the second URI, and the data access rules. The user digital signature is information necessary to prove that the URI authentication document creation transaction is a request by the owner DID included in the second URI authentication document 255, that is, a request by a subject having ownership of the second URI. The data access rules may be understood as access rules for data included in the second URI (and a sub-path of the second URI). In various embodiments, the user device 500 may register a plurality of items (identity information, copyright information, data set sales information) in the second URI authentication document 255 through the URI authentication document creation transaction.

When the verification of the user digital signature is completed (6070), the blockchain network 200 may create the data access rules in the second URI authentication document 255 (6080).

The AI data agent 400 may retrieve the second URI authentication document 255 based on the second URI and access data included in the second URI and/or a sub-address of the second URI (6090).

The AI data agent 400 may calculate a data usage fee corresponding to the second URI and/or the sub-address of the second URI based on the data access rules included in the second URI authentication document 255 (6100) and submit a remittance transaction based on the calculated data usage fee (6110). The remittance transaction may include a company digital signature as a remitter, a data usage fee, URI access details, and a user blockchain account as a recipient. The AI data agent 400 may pay a data usage fee published by the user device 500 in return for accessing the data included in the second URI and/or the sub-address of the second URI. The remittance transaction may be executed on the blockchain network 200, and the user device 500 may retrieve remittance details and a URI access details (the second URI and the sub-path of the second URI) through the blockchain network 200 (6120). Operations 6100 and 6110 correspond to operations 4060 and 4070 of FIG. 4 described above, and a repeated description thereof will be omitted.

In various embodiments, the AI data agent 400 may pay the website administrator blockchain account (the blockchain account of the website management device 100) the usage fee for the use of the data included in the second URI and/or the sub-address of the second URI (4070 in FIG. 4). In this case, the website management device 100 may calculate the data usage fee paid for the second URI and/or the sub-address of the second URI based on the URI access details and execute the remittance transaction to transfer the data usage fee from the administrator blockchain account to the user blockchain account. In this case, the website management device 100 makes calculation to settle data usage fees for users registered in the first URI.

Figure 7:
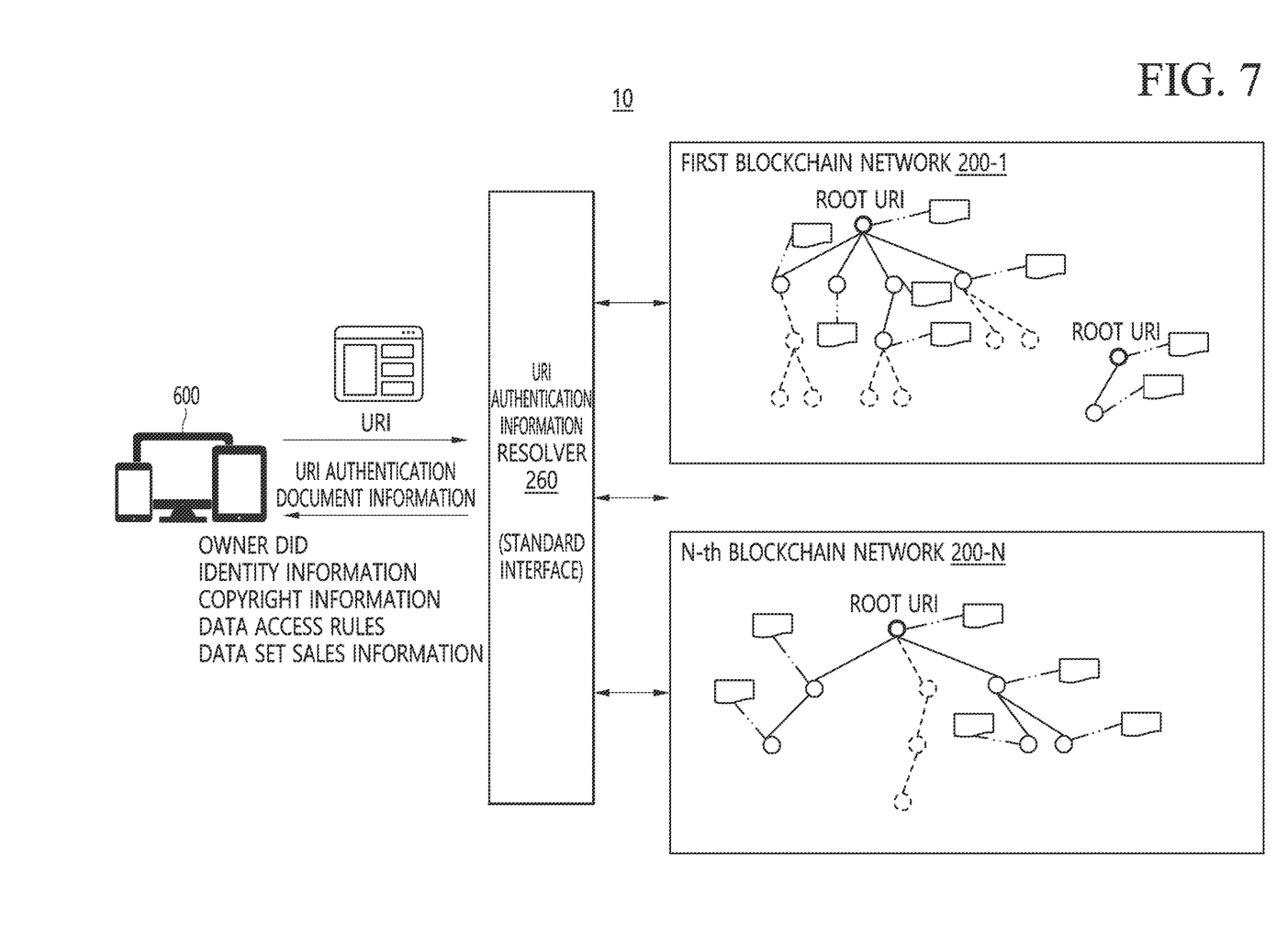
FIG. 7 is a diagram for describing an interface for retrieving a URI authentication document provided on the system according to one embodiment.

FIG. 7 is a diagram for describing an interface for retrieving a URI authentication document provided on the system 10 according to one embodiment. The system 10 may include a plurality of blockchain networks 200-1, . . . , 200-N, and the plurality of blockchain networks 200-1, . . . , 200-N may store trees and URI authentication documents for different URIs, respectively. The system 10 may provide a URI authentication information resolver 260, which is integrally applied to the plurality of blockchain networks 200-1, . . . , 200-N that are different from each other, as a standard interface for retrieving URI authentication documents. Arbitrary electronic devices 600 may transmit only the URI to the URI authentication information resolver 260 as an input value and receive at least one piece of information included in the URI authentication document for the URI as an output value. The electronic devices 600 may input, for example, any page URL on the Internet, and view the ownership, copyright information, data access rules, and the like, related to the URL as a result value.

In operation 3090 of FIG. 3 described above, the website management device 100 may transmit the first URI to the URI authentication information resolver 260, and check whether the owner DID matches its administrator DID in information included in the first URI authentication document 250 returned from the URI authentication information resolver 260. In this way, the website management device 100 may check whether the owner DID of its first URI is correctly registered.

In operation 4040 of FIG. 4 and operation 6090 of FIG. 6 described above, the AI data agent 400 may retrieve data access rules of the first URI authentication document 250 based on the first URI and retrieve data access rules of the second URI authentication document 255 based on the second URI, through the URI authentication information resolver 260.

In various embodiments, when the authentication document corresponding to the input URI is not created, the URI authentication information resolver 260 may provide a value included in the URI authentication document of an ancestor node closest to the input URI as the output value.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic device is not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar or related reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order).

Various embodiments as set forth herein may be implemented as software including one or more instructions that are stored in a storage medium (e.g., the memory 120) that is readable by a machine (e.g., the website management device 100). For example, a processor (e.g., the processor 110) of the machine (e.g., the website management device 100) may invoke at least one of the one or more instructions stored in the storage medium, and execute the invoked instruction. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method according to various embodiments disclosed herein may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, or a relay server.

According to the embodiments disclosed herein, an operator of a website can publish information on data owned by the operator to a blockchain network, directly determine a pricing policy for data, and charge data usage fees. Furthermore, the operator of the website can apply different pricing policies to the data collection agents of a specific company, or set whether to allow or deny access to specific data types.

Further, according to the embodiments disclosed herein, by allowing data usage details to be recorded on a smart contract on the blockchain network, data usage details of AI data agents can be tracked. Besides, various effects may be provided that are directly or indirectly identified through the present disclosure.

According to various embodiments, each component (e.g., a module or a program) of the above-described components may include a single subject or multiple subjects. According to various embodiments, one or more components or operations of the above-described components may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as those performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. A method performed by a website management device, a blockchain network, and an Artificial Intelligence (AI) data agent, the method comprising:
    submitting, by the website management device, a first transaction for a request to create a Universal Resource Identifier (URI) authentication document to the blockchain network, information of the first submitted transaction including an administrator digital signature of the website management device, a first URI, and an access rule for accessing data included in the first URI, wherein the blockchain network stores the information on the URI according to a tree structure and each node has a respective URI authentication document;
    verifying the request, by the blockchain network, the administrator digital signature and adding the access rule in a first URI authentication document, in response to a successful verification of the submitting of the first transaction;
    retrieving, by the AI data agent upon the successful verification, the first URI authentication document based on the first URI, and accessing the data included in a corresponding address of the first URI; and
    submitting, by the AI data agent, a remittance transaction for a data usage fee calculated based on the access rule of the first URI, the remittance transaction having a first blockchain account associated with the website management device as a recipient.

2. The method of claim 1, wherein the method is performed by a plurality of oracles, and
    the method further comprises:
    creating, by the website management device, the first blockchain account and an administrator decentralized identifier (DID) on the blockchain network;
    submitting, by the website management device, a second transaction for URI registration to the blockchain network, the second transaction including the administrator DID and the first URI;
    generating, by the website management device, a domain ownership verification file based on a random value when the random value generated in response to the submitting of the second transaction by the blockchain network is obtained, and uploading the domain ownership verification file to a specific address;

downloading, by each of the plurality of oracles, the domain ownership verification file from the specific address and submitting, to the blockchain network, the domain ownership verification file to which a digital signature generated based on each oracle DID is added; and creating, by the blockchain network, a root node corresponding to the first URI and the first URI authentication document when the blockchain network receives the domain ownership verification files from at least a predetermined number of oracles among the plurality of oracles.

3. The method of claim 2, wherein the method is performed by a user device, the user device is a device associated with a user registered in the first URI, and the method further comprises:

creating, by the user device, a second blockchain account and a user DID on the blockchain network;

transmitting, by the user device, a user registration request to an authentication service, the user registration request including the user DID, the first URI, a second URI on a sub-path of the first URI, and a user digital signature of the user device;

submitting, by the authentication service, a third transaction for user registration to the blockchain network when it is proved that the user device is an owner of the second URI, the third transaction including an authentication service DID, a digital signature of the authentication service, and the second URI; and verifying, by the blockchain network, the digital signature of the authentication service in response to the submitting of the third transaction and creating a child node of the root node corresponding to the second URI and a second URI authentication document.

4. The method of claim 3, wherein the proof that the user device is the owner of the second URI is performed by an OAuth protocol-based user authentication method by the authentication service, the user device, and the website management device.

5. A website management device associated with a first Universal Resource Identifier (URI), the website management device comprising:

a memory configured to store an administrator Decentralized ID (DID) and an administrator private key;

a communication interface configured to communicate with a blockchain network; and at least one processor, wherein the at least one processor is configured to:

submit a first transaction for a request to create a first URI authentication document to the blockchain network, information of the submitted first transaction including an administrator digital signature generated based on the administrator private key, the first URI, and an access rule for accessing data included in the first URI, the blockchain network stores the information on the URI according to a tree structure and each n ode h as a respective URI authentication document;

verify the request, by the blockchain network, the administrator digital signature and adding the access rule in the first URI authentication document, in response to a successful verification of the submitting of the first transaction;

obtain, upon the successful verification, the first URI authentication document based on the first URI, and accessing the data included in a corresponding address of the first URI; and retrieve a remittance transaction having a blockchain account on the blockchain network corresponding to the administrator DID as a recipient, the remittance transaction including a fee statement prepared based on the access rule included in the first URI authentication document.

6. The website management device of claim 5, wherein the at least one processor is configured to:

create the administrator DID and the administrator private key;

submit a second transaction for registration of the first URI to the blockchain network, the second transaction including the administrator DID, the administrator digital signature, and the first URI;

generate a domain ownership verification file based on a random value when the random value generated by the blockchain network in response to the submitting of the second transaction is obtained, and upload the domain ownership verification file to a specific address; and retrieve at least one piece of information included in the first URI authentication document based on the first URI when verification of the domain ownership verification file is completed and a root node corresponding to the first URI and the first URI authentication document corresponding to the root node are created on the blockchain network.

7. The website management device of claim 6, wherein the at least one processor is configured to electronically sign on the first URI, the random value, and a timestamp based on the administrator private key and generate the domain ownership verification file having the generated digital signature.

8. The website management device of claim 6, wherein the at least one processor is configured to:

transmit the first URI to a URI authentication information resolver, obtain an owner DID included in the first URI authentication document returned from the URI authentication information resolver, and compare the owner DID and the administrator DID.

9. The website management device of claim 5, wherein the at least one processor is configured to submit, to the blockchain network, the first transaction including the access rules including at least one path associated with the first URI, a list of user agents to be granted access to data included in the at least one path, and price information for the data included in the at least one path.

10. The website management device of claim 9, wherein the at least one processor is configured to submit, to the blockchain network, the first transaction further including identity information associated with an owner of the first URI and copyright information.

11. The website management device of claim 9, wherein the fee statement includes one or more paths accessed by the user agent and a usage fee, and the usage fee is calculated based on the price information corresponding to the one or more accessed paths.

* * * * *